(12) United States Patent
Viswanatha et al.

(10) Patent No.: US 11,403,218 B2
(45) Date of Patent: Aug. 2, 2022

(54) STORAGE CONTROLLER CACHE INTEGRITY MANAGEMENT

(71) Applicant: Seagate Technology LLC, Fremont, CA (US)

(72) Inventors: Ritvik Viswanatha, Longmont, CO (US); Kishan Gelli, Longmont, CO (US); Joseph Skazinski, Longmont, CO (US)

(73) Assignee: SEAGATE TECHNOLOGY LLC, Fremont, CA (US)

( * ) Notice: Subject to any disclaimer, the term of this patent is extended or adjusted under 35 U.S.C. 154(b) by 82 days.

(21) Appl. No.: 17/091,104

(22) Filed: Nov. 6, 2020

(65) Prior Publication Data

US 2022/0147451 A1 May 12, 2022

(51) Int. Cl.
*G06F 12/00* (2006.01)
*G06F 12/0802* (2016.01)
*G06F 3/06* (2006.01)
*G06F 11/20* (2006.01)

(52) U.S. Cl.
CPC ........ *G06F 12/0802* (2013.01); *G06F 3/0619* (2013.01); *G06F 3/0655* (2013.01); *G06F 3/0679* (2013.01); *G06F 11/2092* (2013.01)

(58) Field of Classification Search
None
See application file for complete search history.

(56) References Cited

U.S. PATENT DOCUMENTS

| | | | |
|---|---|---|---|
| 7,055,057 B2 | 5/2006 | Achiwa | |
| 9,378,145 B2* | 6/2016 | Viswanatha | .......... G06F 3/0689 |
| 9,575,905 B2 | 2/2017 | Viswanatha | |
| 10,664,397 B2 | 5/2020 | Shveidel et al. | |
| 10,691,562 B2 | 6/2020 | Bhatia et al. | |
| 2008/0005614 A1 | 1/2008 | Lubbers et al. | |
| 2012/0102268 A1 | 4/2012 | Smith et al. | |
| 2012/0260127 A1 | 10/2012 | Jibbe et al. | |
| 2015/0012699 A1* | 1/2015 | Rizzo | ................. G06F 12/0815 |
| | | | 711/113 |
| 2015/0019822 A1 | 1/2015 | Samanta et al. | |

* cited by examiner

*Primary Examiner* — Daniel D Tsui
(74) *Attorney, Agent, or Firm* — Westman, Champlin & Koehler, P.A.

(57) ABSTRACT

A system includes first and second redundant controllers, and at least one logical volume accessible to the first and second redundant controllers. The system also includes metadata fields associated with the at least one logical volume. The metadata fields include a first age field configured to store a first age value associated with the first controller and a second age field configured to store a second age value associated with the second controller. The first age value and the second age value are employed to provide an indication of whether cache data for the at least one logical volume is valid. The system further includes a processor configured to update the first and second age values in the respective first and second age fields.

20 Claims, 16 Drawing Sheets

| LV # 128 | CURRENT OWNER 150 | PREFERRED OWNER 152 | AGE OF CONTROLLER A (Age A) 154 | AGE OF CONTROLLER B (Age B) 156 |
|---|---|---|---|---|
| LV A 128a | e.g., S/N OF CONTROLLER A OR B | e.g., SLOT ID OF CONTROLLER A OR B | e.g., 1, 2, ect. | e.g., 1, 2, ect. |
| LV B 128a | e.g., S/N OF CONTROLLER A OR B | e.g., SLOT ID OF CONTROLLER A OR B | e.g., 1, 2, ect. | e.g., 1, 2, ect. |
| ... | ... | ... | ... | ... |
| LV N 128n | e.g., S/N OF CONTROLLER A OR B | e.g., SLOT ID OF CONTROLLER A OR B | e.g., 1, 2, ect. | e.g., 1, 2, ect. |

FIG. 1B

STORAGE CONTROLLER CACHE INTEGRITY MANAGEMENT

SUMMARY

In one embodiment, a system is provided. The system includes first and second redundant controllers, and at least one logical volume accessible to the first and second redundant controllers. The system also includes metadata fields associated with the at least one logical volume. The metadata fields include a first age field configured to store a first age value associated with the first controller and a second age field configured to store a second age value associated with the second controller. The first age value and the second age value are employed to provide an indication of whether cache data for the at least one logical volume is valid. The system further includes a processor configured to update the first and second age values in the respective first and second age fields.

In another embodiment, a method is provided. The method includes maintaining, by first and second redundant controllers, cache data for at least one logical volume. The method also includes managing, by a processor, metadata fields associated with the at least one logical volume. The metadata fields include a first age field capable of storing a first age value associated with the first controller and a second age field capable of storing a second age value associated with the second controller. The first age value and the second age value are employed to provide an indication of whether the cache data for the at least one logical volume is valid.

In yet another embodiment, a system is provided. The system includes a data storage device comprising at least one logical volume accessible to a plurality of redundant controllers. The system also includes metadata fields associated with the at least one logical volume. The metadata fields include age fields configured to store age values associated with different controllers of the plurality of redundant controllers. The age values are employed to provide an indication of whether cache data for the at least one logical volume is valid.

This summary is not intended to describe each disclosed embodiment or every implementation of the storage controller with cache integrity management described herein. Many other novel advantages, features, and relationships will become apparent as this description proceeds. The figures and the description that follow more particularly exemplify illustrative embodiments.

BRIEF DESCRIPTION OF THE DRAWINGS

FIG. 1B is a block diagram illustrating logical volume metadata in accordance with one embodiment.

DETAILED DESCRIPTION OF ILLUSTRATIVE EMBODIMENTS

Embodiments of the disclosure generally relate to systems that employ redundant storage controllers to manage cache memory data.

Redundant storage controllers are expected to ensure cache data integrity for storage device logical volumes when a failure of redundancy occurs. Along with maintaining data integrity, the controllers are also expected to maintain data availability, and reduce a need for manual recovery to the extent possible.

To help achieve these goals, the controllers automatically mirror incoming write data when they are operating normally (e.g., without any controller failures). Therefore, if there is a single controller failure, the partner storage controller detects the failure and takes over logical volumes owned by the failed storage controller. The operation is referred to as failover. When the failed storage controller is fixed or replaced, the partner storage controller returns the logical volumes previously owned by the storage controller. The operation is referred to as failback.

In addition to the above scenarios, there is a need to address use cases where there can be cascaded failures, where first, one storage controller may fail, and then, before the failed storage controller can fully recover, the partner may fail. Current systems deal with addressing some such use cases, where, if the booting controller cannot communicate with its partner controller and there is at least one volume, the booting controller decides whether it has good cache data for the volume. In such current systems, these decisions are based on unique identification information for each controller included in the metadata for each volume. However, these systems do not provide optimal results in certain situations. For example, in active-passive configurations, if the passive controller is booting and the active controller has failed, and there has been no failover to the passive controller on the previous boot, the passive controller has no choice but to assume that it has stale cache data. This choice preserves data integrity, but can lead to periods of extended data unavailability, which cannot be resolved without manual intervention. This is seen in situations where there are cascaded failures, for example, a power cycle followed by a failure of the active controller.

Embodiments of the disclosure address more use cases than the current systems, and maintain cache data integrity and data availability for both active-active and active-passive volume configurations on redundant systems. In doing so, embodiments of the disclosure reduce the need for manual recovery, and increase system uptime. Prior to providing details regarding the different embodiments, a description of an illustrative operating environment is provided below.

Figure 1A:
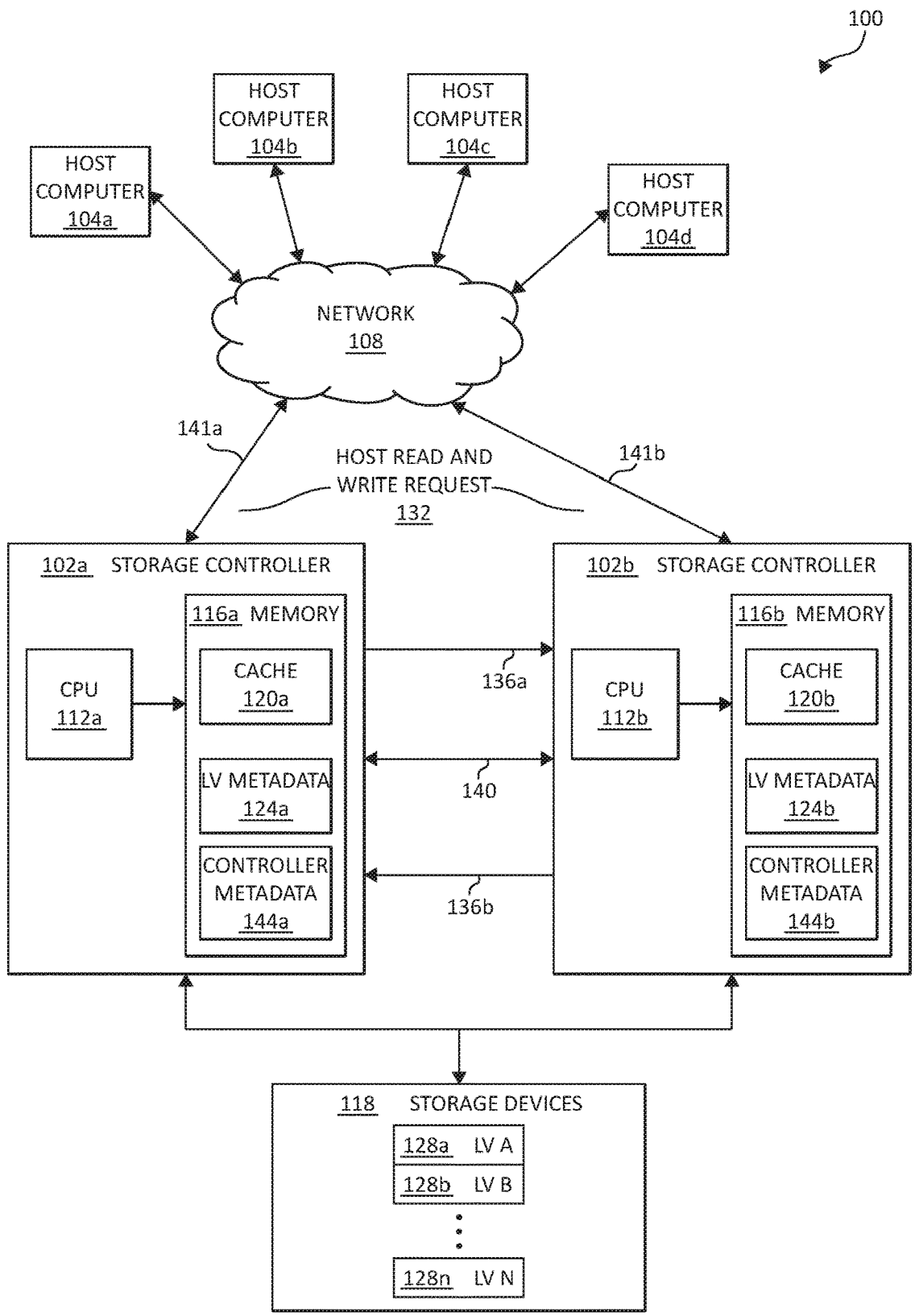
FIG. 1A is a block diagram illustrating a data storage system in accordance with one embodiment.

FIG. 1A shows an illustrative operating environment in which certain specific embodiments disclosed herein may be incorporated. The operating environment shown in FIG. 1A is for illustration purposes only. Embodiments of the present disclosure are not limited to any particular operating environment such as the operating environment shown in FIG. 1A. Embodiments of the present disclosure are illustratively practiced within any number of different types of operating environments.

It should be noted that the same reference numerals are used in different figures for same or similar elements. It should also be understood that the terminology used herein is for the purpose of describing embodiments, and the terminology is not intended to be limiting. Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that, unless indicated otherwise, any labels such as "left," "right," "front," "back," "top," "bottom," "forward," "reverse," "clockwise," "counter clockwise," "up," "down," or other similar terms such as "upper," "lower," "aft," "fore," "vertical," "horizontal," "proximal," "distal," "intermediate" and the like are used for convenience and are not intended to imply, for example, any particular fixed location, orientation, or direction. Instead, such labels are used to reflect, for example, relative location, orientation, or directions. It should also be understood that the singular forms of "a," "an," and "the" include plural references unless the context clearly dictates otherwise.

It will be understood that, when an element is referred to as being "connected," "coupled," or "attached" to another element, it can be directly connected, coupled or attached to the other element, or it can be indirectly connected, coupled, or attached to the other element where intervening or intermediate elements may be present. In contrast, if an element is referred to as being "directly connected," "directly coupled" or "directly attached" to another element, there are no intervening elements present. Drawings illustrating direct connections, couplings or attachments between elements also include embodiments, in which the elements are indirectly connected, coupled or attached to each other.

Referring now to FIG. 1A, a block diagram illustrating a data storage system 100 in accordance with an embodiment of the present disclosure is shown. Data storage system 100 includes one or more host computers 104, identified as host computers 104a, 104b, 104c, and 104d, interconnected to redundant storage controllers 102a and 102b through bus or network 108. Storage controller 102a is sometimes referred to herein as "controller A," and storage controller 102b is sometimes referred to herein as "controller B." Storage controllers 102a and 102b manage one or more data storage devices 118, which may include one or more logical volumes (LVs). Storage controller 102a receives host read and write requests 132 over controller A host input/output (I/O) path 141a, and storage controller 102b receives host read and write requests 132 over controller B host I/O path 141b. It should be noted that each of controller A host I/O path 141a and controller B host I/O path 141b may be one or more individual data paths, and is shown as a single connection to network 108 for simplicity.

Storage controllers 102a, 102b each include a CPU or processor 112a, 112b, respectively, which executes program instructions stored in a memory 116a, 116b, respectively, coupled to the CPU 112a, 112b. CPU 112a, 112b includes any processing device suitable for executing storage controller 102a, 102b programs, such as but not limited to INTEL x86-compatible processors, embedded processors, mobile processors, and/or RISC processors. CPU 112a, 112b may include several devices including but not limited to field-programmable gate arrays (FPGAs), memory controllers, North Bridge devices, and/or South Bridge devices.

Memory 116a, 116b may be one or more forms of volatile memory 116, non-volatile memory 116, or a combination of both volatile and non-volatile memories 116. The memory 116a, 116b includes firmware which includes program instructions that CPU 112a, 112b, respectively, fetches and executes, including program instructions for the processes of the present embodiments. Examples of non-volatile memory 116 include, but are not limited to, flash memory, SD, MMC/eMMC, EPROM, EEPROM, hard disks, and NOVRAM. Volatile memory 116 may store various data structures and user data. Examples of volatile memory 116 include, but are not limited to, SRAM, DDR RAM, DDR2 RAM, DDR3 RAM, Z-RAM, TTRAM, A-RAM, ETA RAM, and other forms of temporary memory.

Each memory 116a, 116b includes a cache memory 120a, 120b, respectively, which provides improved read and write performance to the host computers 104. Host write request data 132 is initially stored in the cache 120 of the storage controller 102 the write is directed to. Memory 116a, 116b also includes LV metadata 124a, 124b, respectively, and controller metadata 144a, 144b, respectively. LV metadata 124a, 124b stores parameters related to LV ownership and status, and is described in more detail with respect to FIG. 1B. Controller metadata 144a, 144b stores metadata related to controller status and is described in more detail with respect to FIG. 1C.

As indicated above, storage controllers 102a, 102b are coupled to one or more storage devices 118. Storage devices 118 include LVs 128, identified as LV A 128a through LV N 128N. Each LV 128 may be individually addressed by storage controllers 102a, 102b. Write data stored in cache 120a, 120b is written by storage controller 102a, 102b, respectively, to one or more LVs 128 of storage devices 118.

Data storage system 100 is a redundant data storage system, with redundant storage controllers 102a, 102b providing substantially continuous read and write access between LVs 128 and storage controllers 102a, 102b. Each storage controller 102 supports independent failover and failback. In order to support failover and failback, storage controllers 102a, 102b provide inter-controller communications to understand the health of the other controller and transfer status and data between the storage controllers 108a, 108b.

Storage controller 102a provides a heartbeat and reset communication path 136a to storage controller 102b, and storage controller 102b provides a heartbeat and reset communication path 136b to storage controller 102a. Heartbeat and reset communication paths 136a, 136b provide a periodic signal to the other controller 102 that identifies the sending controller 102 as being at least partially functional. Heartbeat and reset communication paths 136a, 136b also provide a reset request to the other controller 102 to take itself offline while the reset request 136 is asserted.

Storage controllers 102a, 102b share an inter-controller messaging link 140. The inter-controller messaging link 140 allows the storage controllers 102 to provide and respond to various commands and status requests, and transfer cache 120 data to the cache memory 120 of the other controller 102 under certain circumstances that will be explained herein.

It should be understood that storage controllers 102a, 102b may be functionally organized in countless different functional organizations and architectures without diverting from the scope or operation of the present disclosure.

Referring now to FIG. 1B, a diagram illustrating LV metadata 124 in accordance with an embodiment of the present disclosure is shown. LV metadata 124 includes various parameters that may be employed by storage controllers 102 to manage LVs 128 and data in the cache 120. LV metadata 124 is stored on storage devices 118, and may be read into storage controller memory 116 under different operational conditions. In general, a copy of LV metadata 124 may be kept in storage controller memory 116 for performance reasons to avoid frequent reads of the LV metadata 124 from storage devices 118, which may be slower than reading the LV metadata 124 copies from storage controller memory 116. LV metadata 124 may written back to storage devices 118 any time a storage controller 102 makes changes to the LV metadata 124. For each LV 128, LV metadata 124 may include identification of the current owner 150, preferred owner 152, age of controller A 154 and age of controller B 156. It should be noted that, in different embodiments, any suitable number of redundant controllers may be employed, and a number of controller age fields such as 154 and 156 will correspond to the number of redundant controllers. In general, LV metadata 124 parameters or fields are not limited to those shown in FIG. 1B.

It should be noted that some embodiments do not rely on the metadata in volatile controller memory such as RAM. Such embodiments directly utilize the metadata stored on the non-volatile storage medium, such as hard drives (e.g., storage devices 118). Storing the metadata in a single/common non-volatile storage location allows all controllers access to the most relevant state and ages and other metadata. Thus, any controller can read the metadata from the common storage location and access the ages to determine cache state.

In FIG. 1B, the current owner 150 identifies the storage controller 102 that currently has ownership of the LV 128. In one embodiment, the current owner 150 is identified by a serial number of the storage controller 102 that owns the LV 128, where each storage controller 102 is factory programmed with a unique serial number. In other embodiments, a storage controller identifier (ID) or slot ID is used to identify the storage controller 102 that is the current owner 150. In yet other embodiments, a different storage controller 102 identification scheme is used.

The preferred owner 152 identifies the storage controller 102 that the user or system administrator wishes to own the LV 128 under normal operating conditions. The preferred owner 152 may generally be established during initial system configuration, and can be changed by a user or system administrator using a configuration utility, graphical user interface (GUI), or some other method. In one embodiment, the preferred owner 152 is identified with a slot ID, which is a system-level ID identifying a physical location the storage controller 102 is installed in a storage subsystem. In other embodiments, the preferred owner 152 may be identified by a storage controller 102 serial number or other means of identification.

Age fields 154 and 156 are used to store age values for storage controllers 102a and 102b, respectively. In some embodiments, the age values may be positive integers that are updatable. The age values are used to indicate whether cache data for the LV(s) 128 is valid. Details regarding how age values are used to determine whether the cache data for the LV(s) 128 is valid under different operating conditions are provided further below.

Figure 1C:
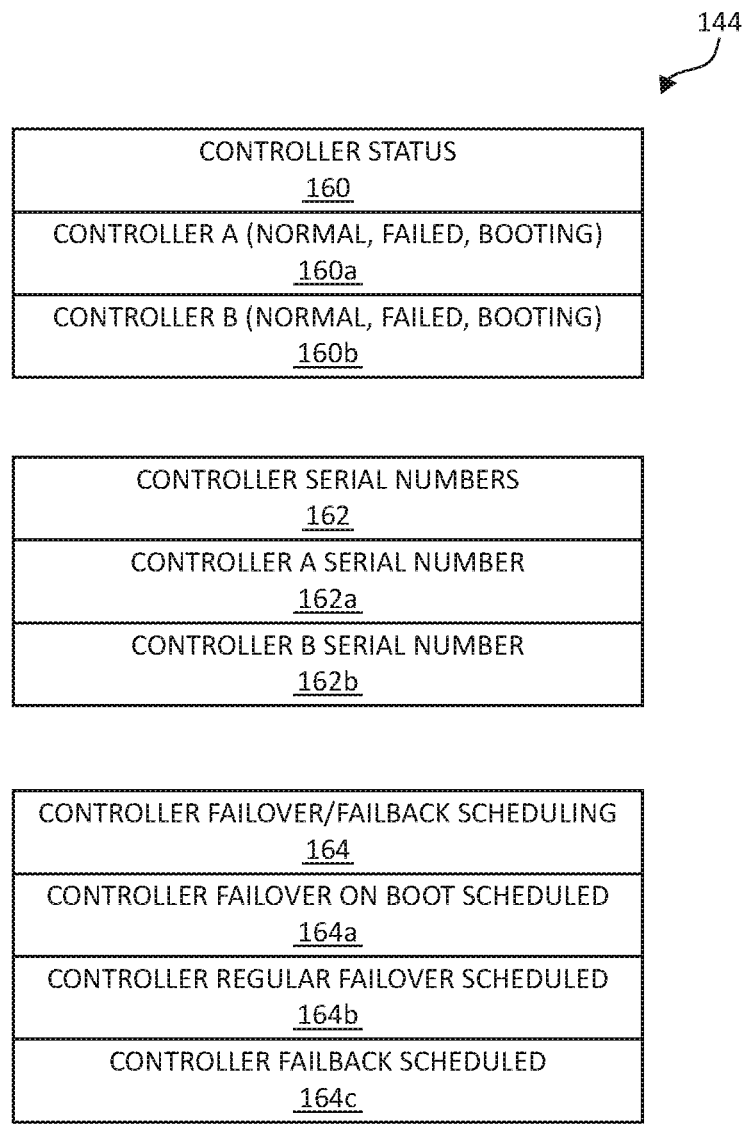
FIG. 1C is a block diagram illustrating controller metadata in accordance with one embodiment.

Referring now to FIG. 1C, a diagram illustrating controller metadata 144 in accordance with an embodiment of the present disclosure is shown. Controller metadata 144 are parameters maintained in storage controller memory 116 of each storage controller 108.

Controller metadata 144 includes controller status 160 for each storage controller 102. Controller status 160 includes an indication of whether the corresponding storage controller 102 is either in normal operation, failed, or booting. Controller status 160a applies to storage controller 102a or controller A, and controller status 160b applies to storage controller 102b or controller B.

Controller metadata 144 also includes controller serial numbers 162 for each storage controller 102. Controller serial number 162a is the serial number for storage controller 102a or controller A, and controller serial number 162b is the serial number for storage controller 102b or controller B.

Controller metadata 144 also includes controller failover/failback scheduling flags 164. A given storage controller 102 may maintain controller failback/failover scheduling flags 164 for itself, and not for other storage controllers 102. Controller failover/failback scheduling flags 164 include controller failover on boot scheduled 164a, controller regular failover scheduled 164b, and controller failback scheduled 164c. In the interest of simplification, the operation of the flags 164 is not described herein.

Figure 2:
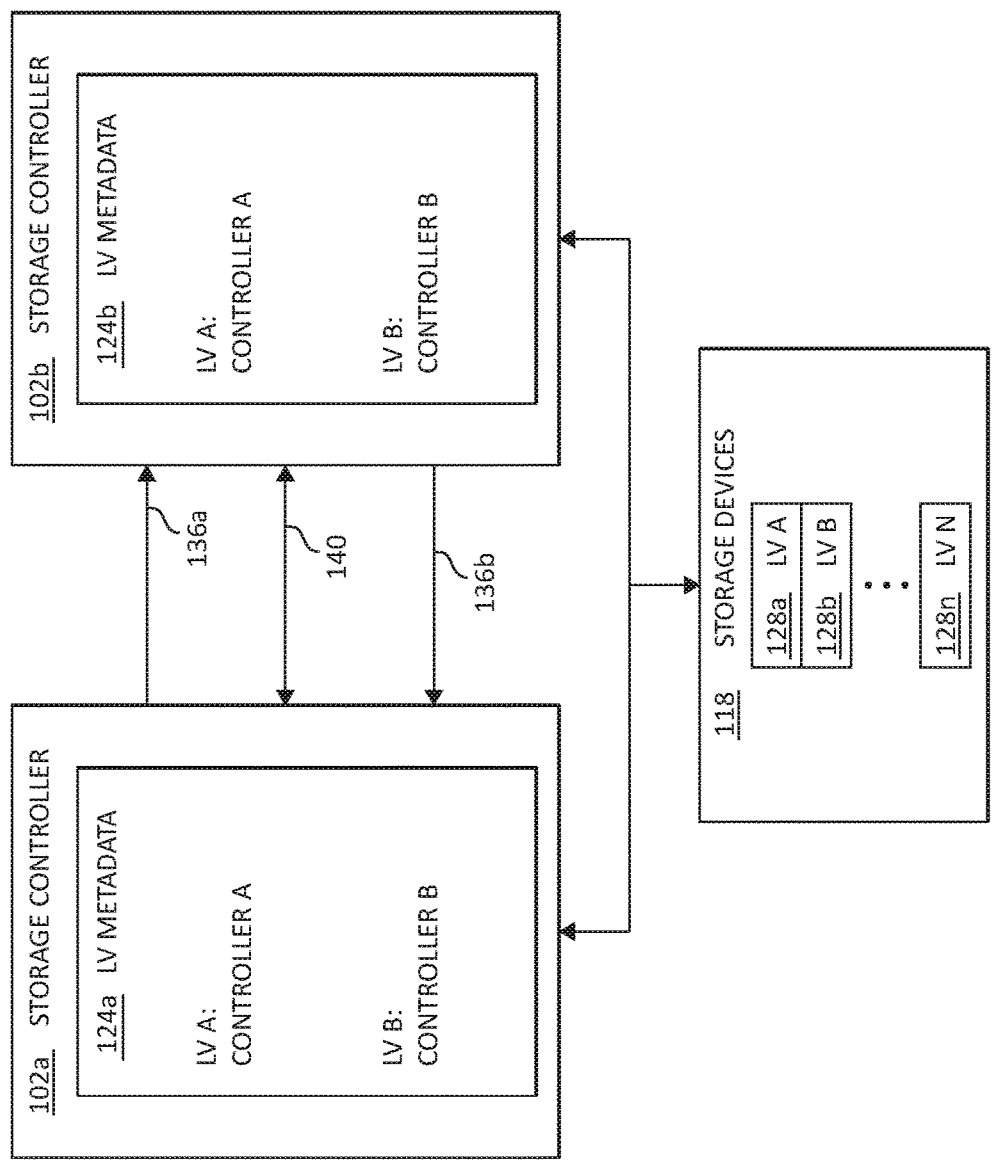
FIG. 2 is a block diagram illustrating normal storage controller operation in accordance with one embodiment.

Referring now to FIG. 2, a block diagram illustrating normal storage controller 102 operation in accordance with an embodiment of the disclosure is shown. The storage controller 102 is a redundant system including two storage controllers 102, identified as storage controller A 102a and storage controller B 102b. Both storage controllers 102a, 102b are interconnected to each other through inter-controller link 140 and heartbeat/reset links 136a, 136b. Both storage controllers 102a, 102b are also interconnected to one or more storage devices 118, which includes two LVs 128 identified as LV A 128a and LV B 128b.

In the configuration shown in FIG. 2, it is assumed that in normal operation, storage controller A 102a is the current owner 150 for LV A 128a, and storage controller B 102b is the current owner 150 for LV B 128b. The current owner 150 status is identified in LV metadata 124a, 124b, which is read from storage device(s) 118 and stored in the memory 116 of each storage controller 102a, 102b. Scenarios in which normal operation may be disrupted in at least one of storage controller A or storage controller B are described further below in connection with FIGS. 3A-3L.

As indicated earlier, embodiments of the disclosure employ a process that utilizes age fields to indicate whether cache data for the LV(s) 128 is valid when, for example, normal operation of at least one storage controller may be disrupted. Aspects of that process are listed below.

a. The process maintains an age field for each controller (e.g., for a system including two controllers, AgeA for controller A and AgeB for controller B) in the metadata of each logical volume.

Terminology used for a two-controller system is:
  On controller A, local age=AgeA, partner age=AgeB
  On controller B, local age=AgeB, partner age=AgeA b. Rules for age field updates are:
1. When a logical volume is newly created, the age field is updated as follows:
   local age is set to partner age if both controllers are up (e.g., operating normally), and in a redundant state
   local age is set to greater than partner age if partner has failed/shutdown/been removed, and logical volumes are failed over
2. If partner gets failed/shutdown/removed, survivor controller fails over logical volumes, and increments its local age field on all logical volumes (local and failed over) if age fields are equal
   e.g., if B crashes, and AgeA=AgeB, A updates AgeA on all logical volumes
3. If the partner controller boots back up, during failback, the survivor controller remirrors its cache data to the booting partner. After a successful cache remirror, before failing back the partner's volumes, the survivor controller makes local age=partner age on all logical volumes
   After successful remirror to B, A updates AgeB and makes AgeA=AgeB on all logical volumes c. Rules for age field use are:
1. After taking over a logical volume, if local age>=partner age, the logical volume stays online 2. After taking over a logical volume, if local age<partner age, the logical volume is quarantined
   e.g., if A takes over a logical volume, and AgeA<AgeB, A quarantines the logical volume
d. If controllers follow the above rules for age field update and use, the following conclusions can be drawn by a booting controller about whether it has good or stale cache data. To draw these conclusions, the controller looks at the age field in the logical volume metadata, and communication with the partner controller is unnecessary
   1. If local age>partner age for at least one logical volume, the local controller has a good cache and the partner controller has a stale cache. The local controller can make logical volume data available to the host.
   2. If partner age>local age for at least one logical volume, the partner controller has a good cache and the local controller has a stale cache. A recovery procedure is run.
   3. If local age=partner age for all logical volumes, both controllers have good caches. The local controller can make logical volume data available to the host.

Different example scenarios in which the operation of at least one of two controllers may be disrupted are listed below in Table 1, and how the different scenarios are addressed by the process using the age fields are described further below in connection with FIGS. 3A-3L.

TABLE 1

|  | Initial condition: A is failed over Events: B boots, cache remirror succeeds | Initial condition: A is failed over Events: B boots, A crashes before cache remirror | Initial condition: A is failed over Events: Power cycle, then A crashes | Initial condition: Controllers are active-active Events: Power cycle, then A crashes |
|---|---|---|---|---|
| Both controllers own volumes | Scenario 1 | Scenario 2 | Scenario 3 | Scenario 4 |
| Only Controller A owns volumes | Scenario 5 | Scenario 6 | Scenario 7 | Scenario 8 |
| Only Controller B owns volumes | Scenario 9 | Scenario 10 | Scenario 11 | Scenario 12 |

FIGS. 3A-3L are simplified block diagrams that illustrate the different scenarios listed in Table 1 above. In the interest of simplification, communication links between storage controllers A and B are not shown in FIGS. 3A-3L.

Figure 3A:
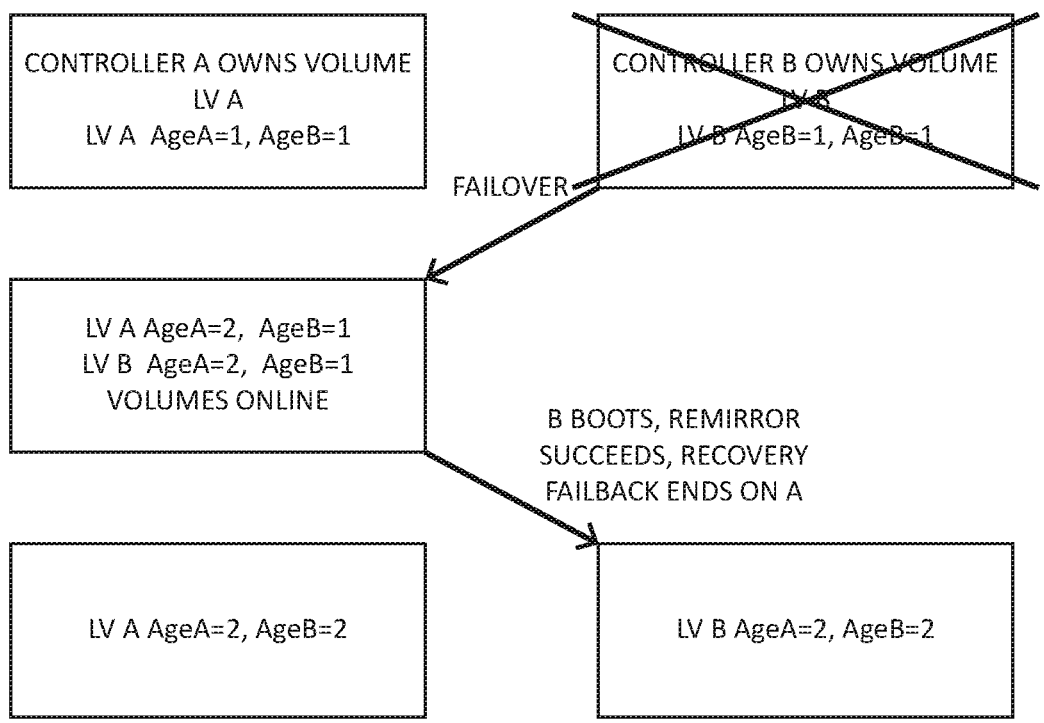
FIGS. 3A-3L are simplified bock diagrams that illustrate different scenarios of controller operation in accordance with embodiments of the disclosure.

Referring now to FIG. 3A, a simplified block diagram that illustrates Scenario 1 of Table 1 is shown. In this scenario, storage controller B has experienced failure. For example, storage controller B may have experienced an internal malfunction, resulting in loss of heartbeat (e.g., 136b of FIG. 2) to storage controller A. At the time of failure of storage controller B, storage controller A owns LV A and storage controller B owns LV B. Age values in age fields AgeA and AgeB for both LV A and LV B are equal to 1 when storage controller B fails.

Storage controller A, observing the loss of the heartbeat, takes over the LV B where storage controller B was the current owner, thereby resulting in storage controller A now being the current owner of both LVs A and B. In other words, a failover of controller B is carried out. After completion of a successful failover operation, AgeA for both LVs A and B is incremented by 1. Since AgeA is greater that AgeB and both LVs A and B are owned by controller A, according the process rule c1 included above, a condition for LVs A and B to be online is satisfied.

Storage controller B may either be repaired or replaced, and then successfully rebooted. After the successful reboot of storage controller B, a failback operation for storage controller B may be carried out. In the failback operation, storage controller A restores to storage controller B the LV(s) where storage controller B is the preferred, but not the current, owner. Therefore, LV B is restored to storage controller B. LV metadata is updated to reflect the current owner assignments after the failback operation. Additionally, as part of the failback operation, storage controller A copies the contents of its cache (e.g., 120a of FIG. 1A) to the storage controller B cache (e.g., 120b of FIG. 1A). This ensures that all of the write data has been restored and both storage controller A and storage controller B will be assured of writing back good data to the storage device(s). The presence of good data is reflected by incrementing AgeB for both LV A and LV B by 1. Specifically, at the end of Scenario 1, storage controller A owns LV A, storage controller B owns LV B, and AgeA and AgeB values are equal for both LVs A and B. This, satisfies condition d3 of the process included above. It should be noted that both LV A and LV B may remain online after the failback is complete. In the interest of brevity, the remaining scenarios are more succinctly described.

Figure 3B:
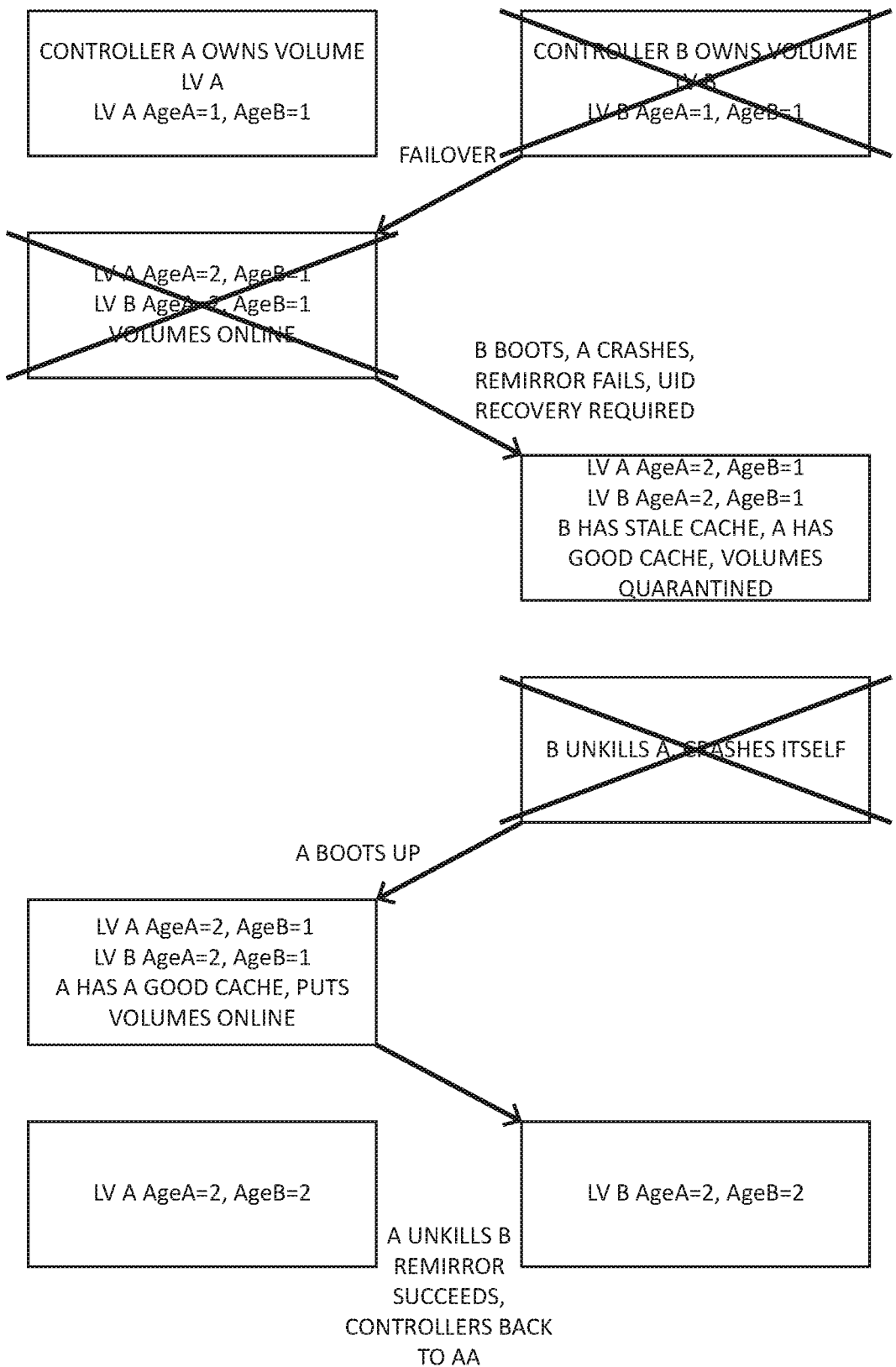

Referring now to FIG. 3B, a simplified block diagram that illustrates Scenario 2 of Table 1 is shown. In this scenario, initially, storage controller A owns LV A, storage controller B owns LV B, and storage controller B fails. Further, in the initial state, AgeA=1 and AgeB=1 for both LVs A and B.

After storage controller B's failure, a failover operation, which involves storage controller A taking over ownership of LV B, is carried out. After the failover successfully completes, AgeA for both LVs A and B is incremented by 1, thereby satisfying the process rule c1.

After the failover operation, storage controller B boots, but storage controller A crashes and a remirror operation fails, thereby leaving storage controller B with a stale cache. Since controller B is the only functional storage controller, and AgeA>AgeB for both LVs A and B, condition d2 of the process applies, and therefore a recovery operation is carried out. The age values imply that storage controller A has the good cache, but storage controller A is in a failed state and process rule c2 is satisfied. Therefore, LVs A and B are quarantined.

Storage controller B then unkills storage controller A, but crashes itself. Thereafter, storage controller A boots up. Since AgeA=2 and AgeB=1 for both LVs A and B, storage controller A has a good cache and condition c1 of the process is satisfied. Therefore, storage controller A puts LVs A and B online.

Thereafter, storage controller A unkills storage controller B, and the cache remirror succeeds. Thus, both storage controllers A and B have good caches. Age fields for LVs A and B are updated such that AgeA=2 and AgeB=2 for both LVs A and B. This, satisfies condition d3 of the process included above.

Figure 3C:
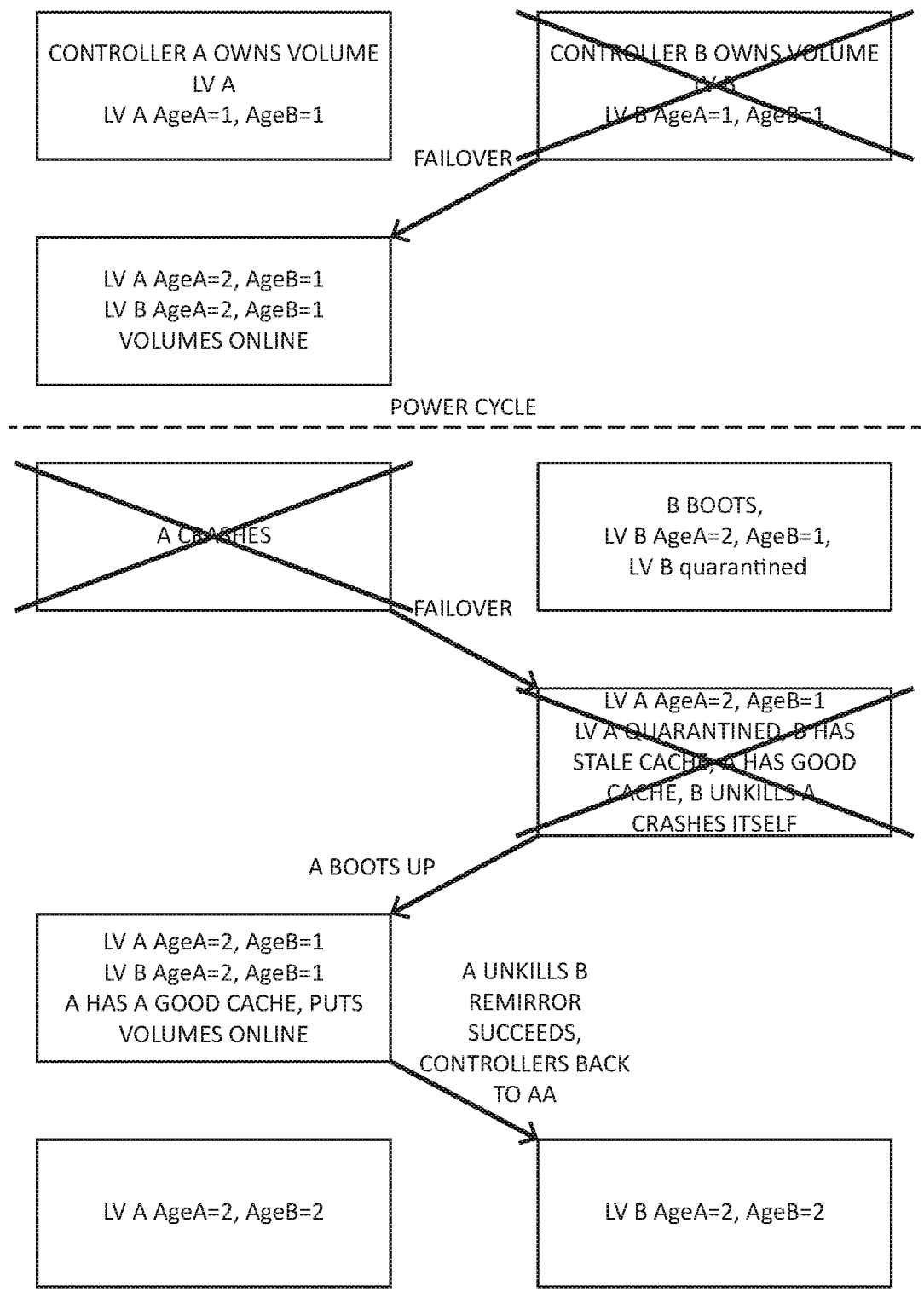

Referring now to FIG. 3C, a simplified block diagram that illustrates Scenario 3 of Table 1 is shown. In this scenario, initially, storage controller A owns LV A, storage controller B owns LV B, and storage controller B fails. Further, in the initial state, AgeA=1 and AgeB=1 for both LVs A and B.

After storage controller B's failure, a failover operation, which involves storage controller A taking over ownership of LV B, is carried out. After the failover successfully completes, AgeA for both LVs A and B is incremented by 1, thereby satisfying the process rule c1.

Storage controllers A and B are then power cycled. During the power cycle, storage controller A crashes and storage controller B boots. Since AgeA=2 and AgeB=1, according to the process rule c2 described above, LV B is quarantined.

After storage controller A's failure (e.g., crash), a failover operation, which involves storage controller B taking over ownership of LV A, is carried out. Since the age fields for LVs A and B have values of AgeA=2 and AgeB=1, and storage controller A has still not recovered from the crash, LV A is quarantined in accordance with process rule c2. Also, the age field values imply that LV B has a stale cache and LV A has a good cache.

After the failover operation, storage controller B unkills storage controller A, but crashes itself. Storage controller A boots up. Since AgeA=2 and AgeB=1 for both LVs A and B, storage controller A has a good cache, and condition c1 of the process is satisfied. Therefore, storage controller A puts LVs A and B online.

Thereafter, storage controller A unkills storage controller B, and the cache remirror succeeds. Thus, both storage controllers A and B have good caches. Age fields for LVs A and B are updated such that AgeA=2 and AgeB=2 for both LVs A and B. This, satisfies condition d3 of the process included above.

Figure 3D:
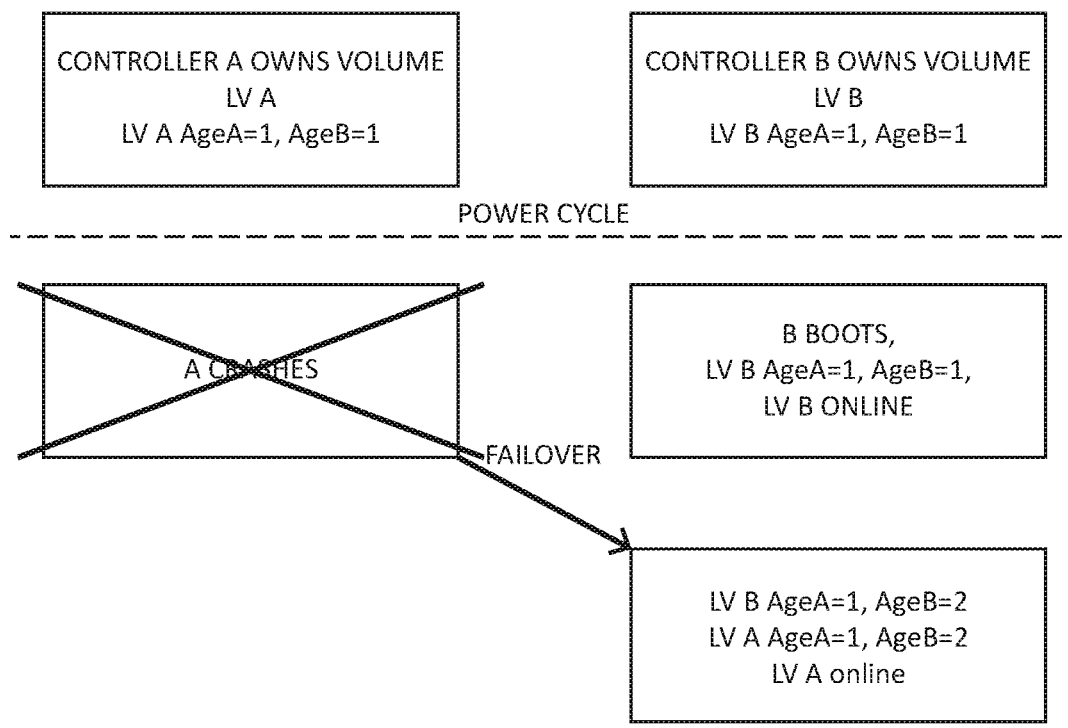

Referring now to FIG. 3D, a simplified block diagram that illustrates Scenario 4 of Table 1 is shown. In this scenario, initially, storage controller A owns LV A, storage controller B owns LV B, and age fields for LVs A and B have values of AgeA=1 and AgeB=1. Storage controllers A and B are then power cycled. During the power cycle, storage controller A crashes. However, controller B boots up.

After storage controller A's failure and storage controller B booting up, a failover operation, which involves storage controller B taking over ownership of LV A, is carried out. After the failover successfully completes, AgeB for both LVs A and B is incremented by 1, thereby satisfying the process rule c1 to keep LV A online.

Figure 3E:
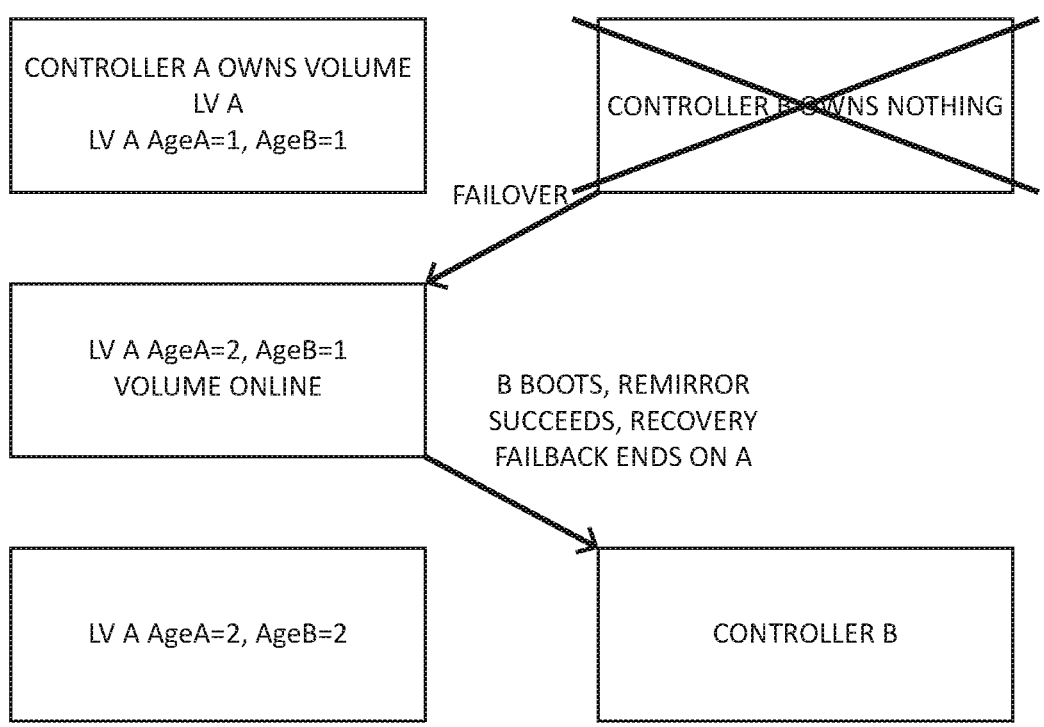

Referring now to FIG. 3E, a simplified block diagram that illustrates Scenario 5 of Table 1 is shown. In this scenario, storage controller B has experienced failure. At the time of failure of storage controller B, storage controller A owns LV A and storage controller B owns nothing. Age values in age fields AgeA and AgeB for LV A are equal to 1 when controller B fails.

In response to storage controller B's failure, a failover of controller B is carried out. After completion of a successful failover operation, AgeA for LV A is incremented by 1. Since AgeA is greater that AgeB and LV A is owned by controller A, according the process rule c1 included above, a condition for LV A to be online is satisfied.

Storage controller B is successfully rebooted. After the successful reboot of storage controller B, a failback operation for storage controller B and a cache remirror are carried out. AgeB for LV A is then incremented by 1, thereby making AgeA and AgeB equal for LV A. This, satisfies condition d3 of the process included above.

Figure 3F:
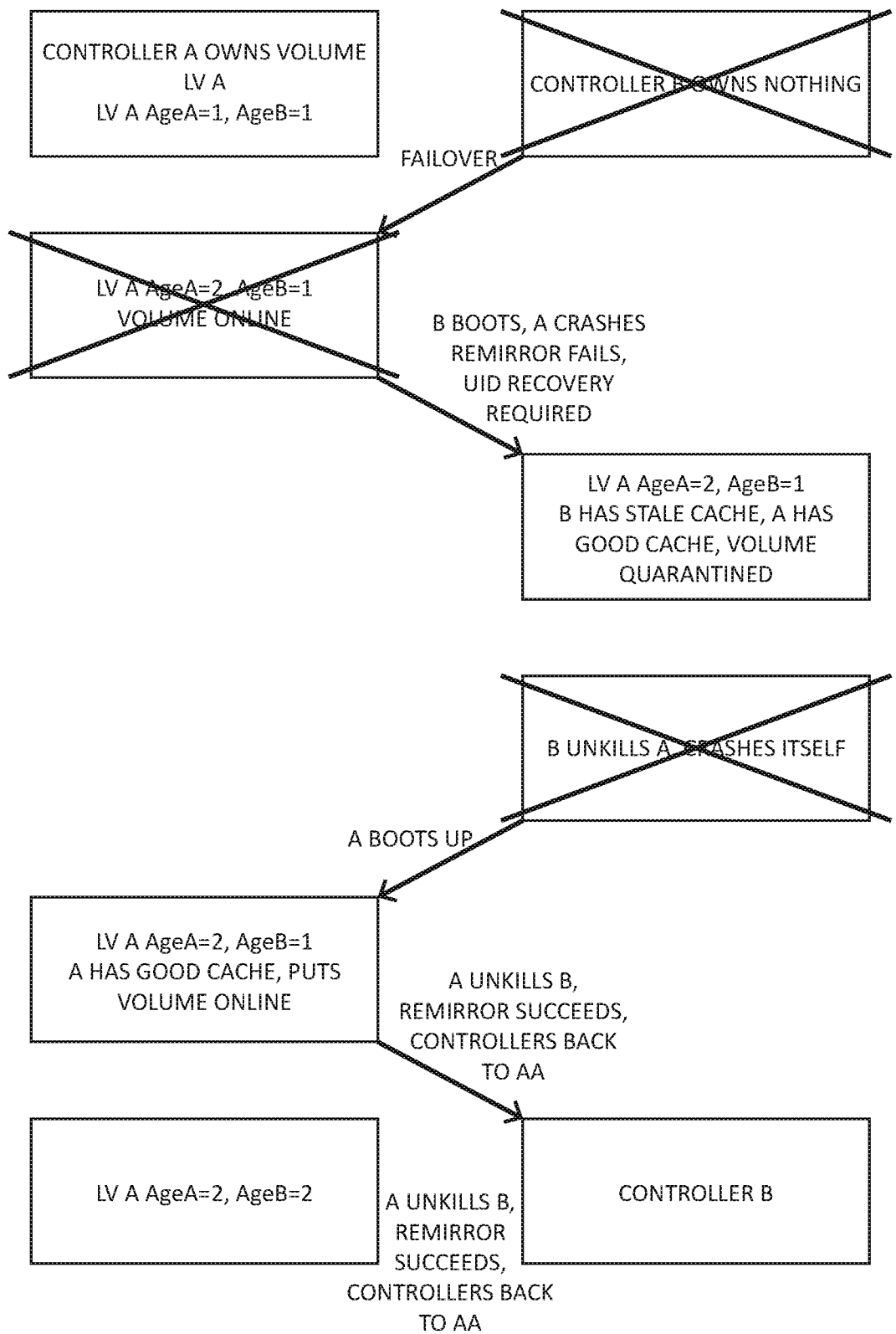

Referring now to FIG. 3F, a simplified block diagram that illustrates Scenario 6 of Table 1 is shown. In this scenario, initially, storage controller A owns LV A, storage controller B owns nothing, and storage controller B fails. Further, in the initial state, AgeA=1 and AgeB=1 for LV A.

After storage controller B's failure, a failover operation is carried out. After the failover successfully completes, AgeA for LV A is incremented by 1, thereby satisfying the process rule c1.

After the failover operation, storage controller B boots, but storage controller A crashes and a remirror operation fails, thereby leaving storage controller B with a stale cache. Since controller B is the only functional storage controller, and AgeA>AgeB for LV A, condition d2 of the process applies, and therefore a recovery operation is carried out. The age values imply that storage controller A has the good cache, but storage controller A is in a failed state and process rule c2 is satisfied. Therefore, LV A is quarantined.

Storage controller B then unkills storage controller A, but crashes itself. Thereafter, storage controller A boots up. Since AgeA=2 and AgeB=1 for LV A, storage controller A has a good cache and condition c1 of the process is satisfied. Therefore, storage controller A puts LV A online.

Thereafter, storage controller A unkills storage controller B, and the cache remirror succeeds. Thus, both storage controllers A and B have good caches. AgeB for LV A is updated such that AgeA=2 and AgeB=2 for logical LV A. This, satisfies condition d3 of the process included above.

Figure 3G:
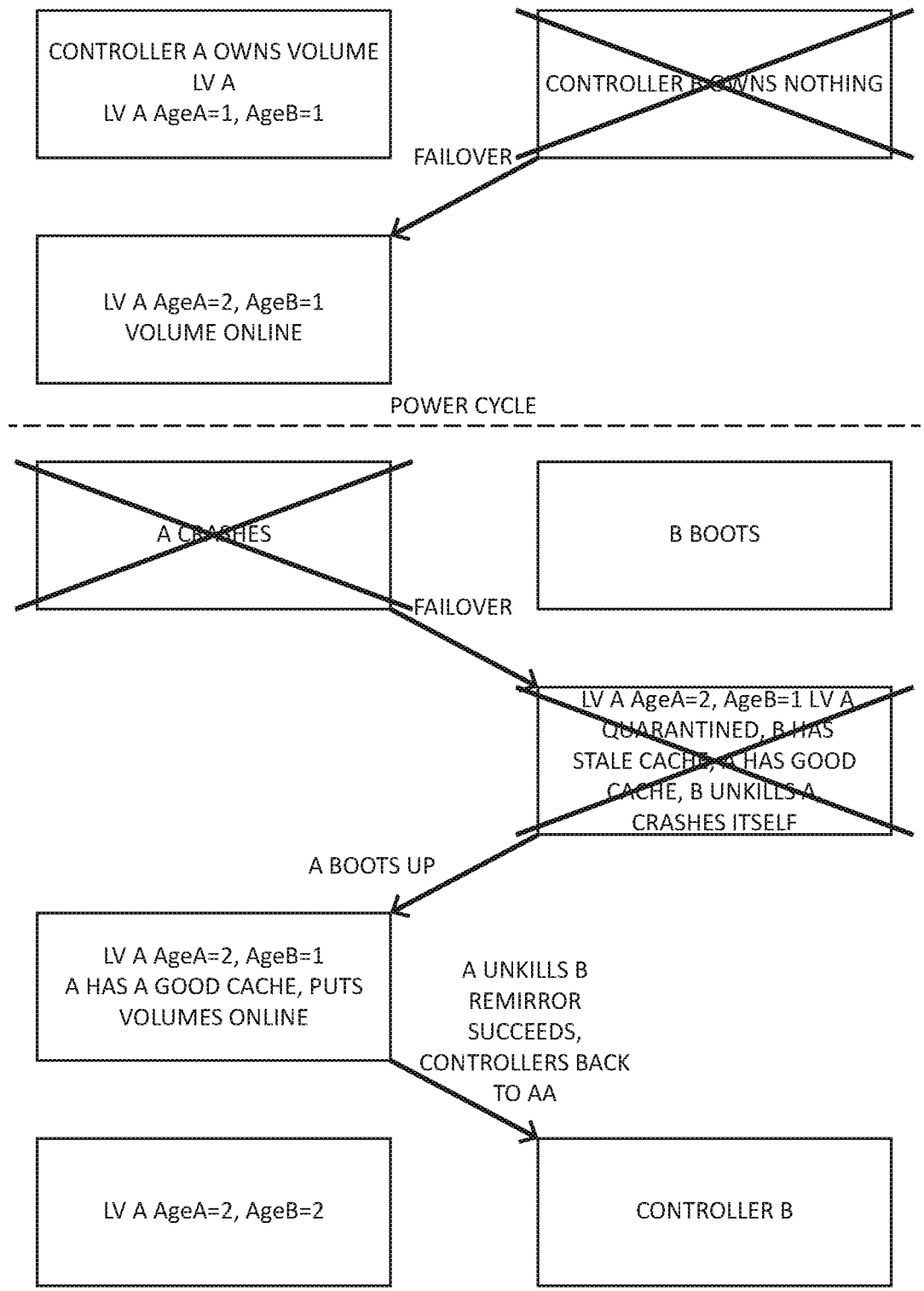

Referring now to FIG. 3G, a simplified block diagram that illustrates Scenario 7 of Table 1 is shown. In this scenario, initially, storage controller A owns LV A, storage controller B owns nothing, and storage controller B fails. Further, in the initial state, AgeA=1 and AgeB=1 for LV A.

After storage controller B's failure, a failover operation is carried out. After the failover successfully completes, AgeA for LV A is incremented by 1, thereby satisfying the process rule c1.

Storage controllers A and B are then power cycled. During the power cycle, storage controller A crashes and storage controller B boots.

After storage controller A's failure (e.g., crash), a failover operation, which involves storage controller B taking over ownership of LV A, is carried out. Since the age fields for LV A have values of AgeA=2 and AgeB=1, and storage controller A has still not recovered from the crash, LV A is quarantined in accordance with process rule c2. Also, the age field values imply that LV B has a stale cache and LV A has a good cache.

After the failover operation, storage controller B unkills storage controller A, but crashes itself. Storage controller A boots up. Since AgeA=2 and AgeB=1 for LV A, and storage controller A has a good cache, condition c1 of the process is satisfied and therefore storage controller A puts LV A online.

Thereafter, storage controller A unkills storage controller B, and the cache remirror succeeds. Thus, both storage controllers A and B have good caches. AgeB for LV A is updated such that AgeA=2 and AgeB=2 for LV A. This, satisfies condition d3 of the process included above.

Figure 3H:
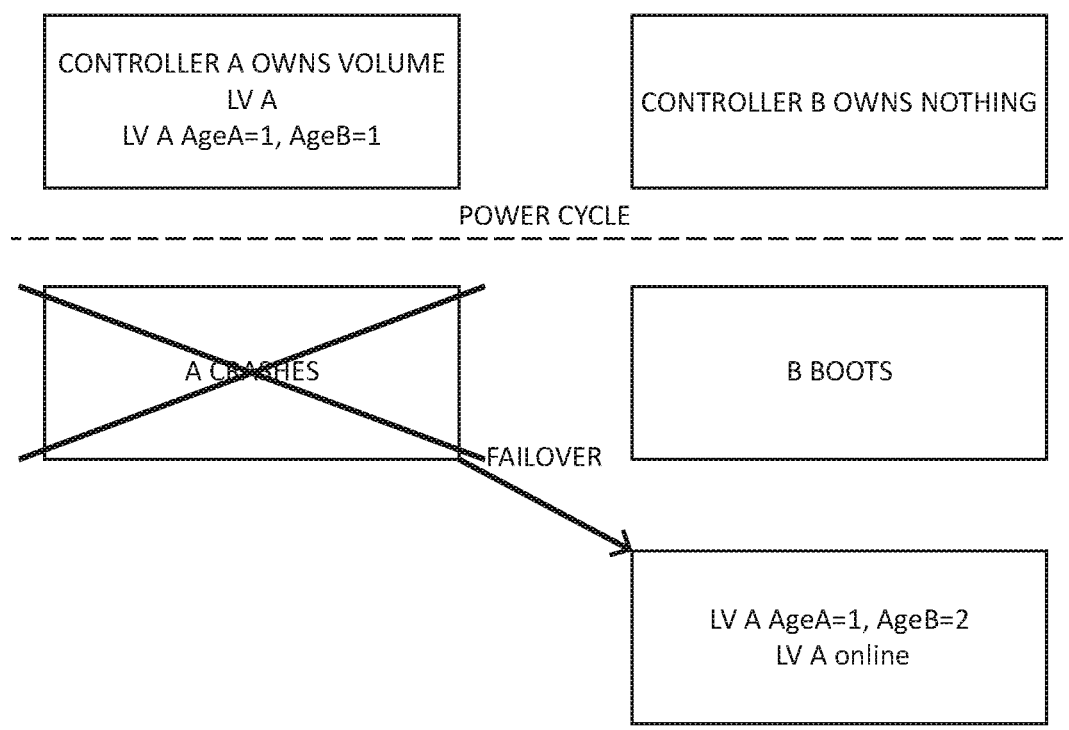

Referring now to FIG. 3H, a simplified block diagram that illustrates Scenario 8 of Table 1 is shown. In this scenario, initially, storage controller A owns LV A, storage controller B owns nothing, and age fields for LV A have values of AgeA=1 and AgeB=1. Storage controllers A and B are then power cycled. During the power cycle, storage controller A crashes. However, controller B boots up.

After storage controller A's failure and storage controller B booting up, a failover operation, which involves storage controller B taking over ownership of LV A, is carried out. After the failover successfully completes, AgeB for LV A is incremented by 1, thereby satisfying the process rule c1 to keep LV A online.

Figure 3I:
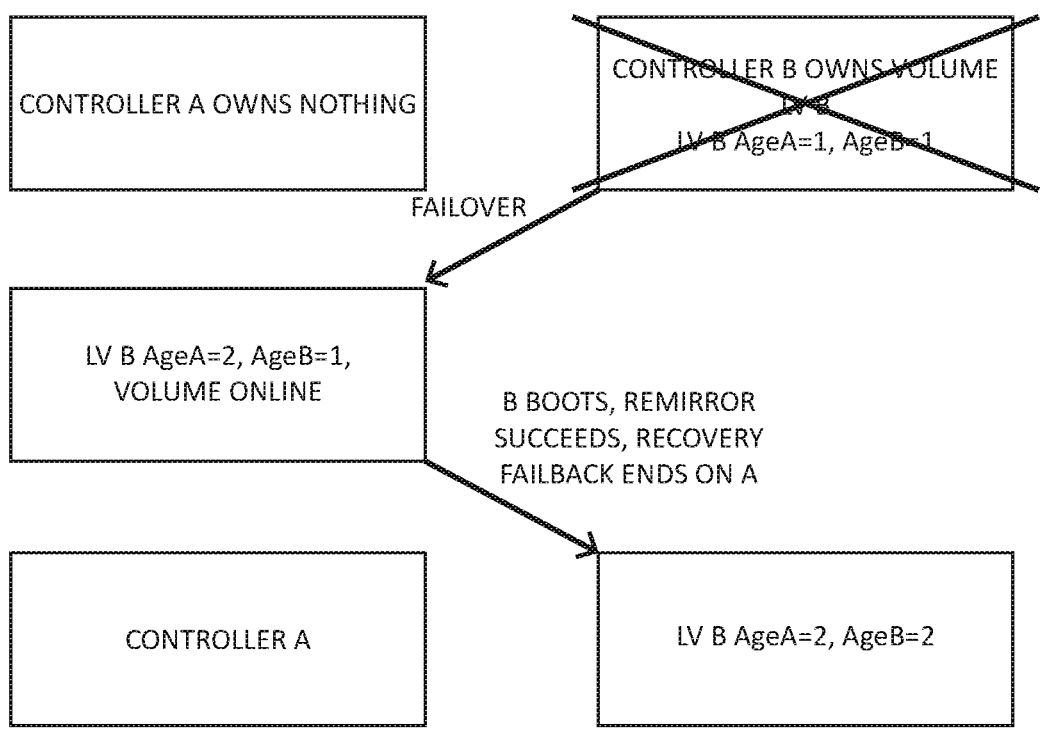

Referring now to FIG. 3I, a simplified block diagram that illustrates Scenario 9 of Table 1 is shown. In this scenario, storage controller B has experienced failure. At the time of failure of storage controller B, storage controller A owns nothing and storage controller B owns LV B. Age values in age fields AgeA and AgeB for LV B are equal to 1 when controller B fails.

In response to storage controller B's failure, a failover of controller B is carried out. After completion of a successful failover operation, AgeA for LV B is incremented by 1. Since AgeA is greater than AgeB and LV B is owned by controller A, according the process rule c1 included above, a condition for LV B to be online is satisfied.

Storage controller B is successfully rebooted. After the successful reboot of storage controller B, a failback operation for storage controller B and a cache remirror are carried out. AgeB for LV B is then incremented by 1, thereby making AgeA and AgeB equal for LV B. This, satisfies condition d3 of the process included above.

Figure 3J:
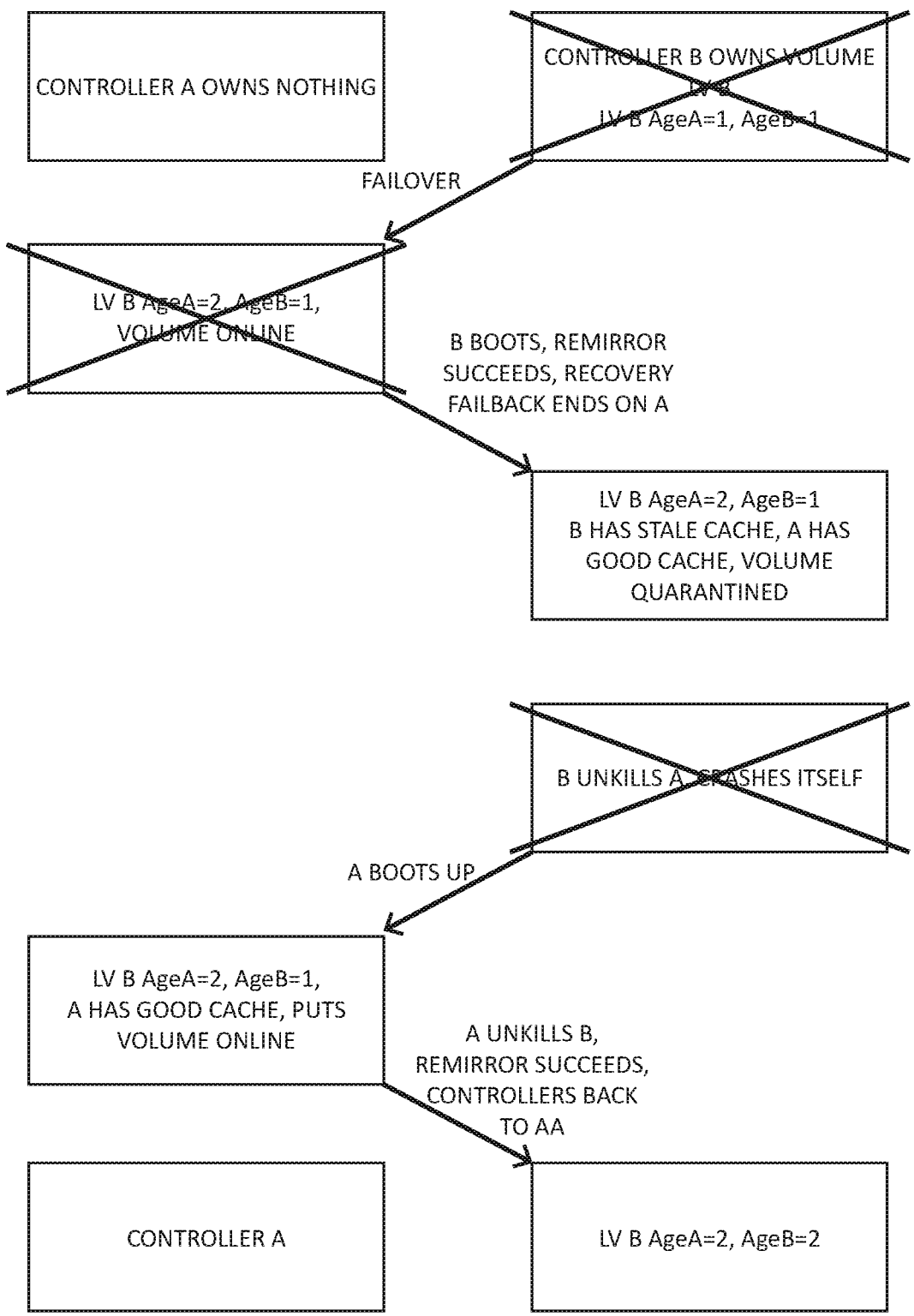

Referring now to FIG. 3J, a simplified block diagram that illustrates Scenario 10 of Table 1 is shown. In this scenario, initially, storage controller A owns nothing, storage controller B owns LV B, and storage controller B fails. Further, in the initial state, AgeA=1 and AgeB=1 for LV B.

After storage controller B's failure, a failover operation is carried out. After the failover successfully completes, AgeA for LV B is incremented by 1, thereby satisfying the process rule c1.

After the failover operation, storage controller B boots, but storage controller A crashes and a remirror operation fails, thereby leaving storage controller B with a stale cache. Since controller B is the only functional storage controller, and AgeA>AgeB for LV B, condition d2 of the process applies, and therefore a recovery operation is carried out. The age values imply that storage controller A has the good cache, but storage controller A is in a failed state and process rule c2 is satisfied. Therefore, LV B is quarantined.

Storage controller B then unkills storage controller A, but crashes itself. Thereafter, storage controller A boots up. Since AgeA=2 and AgeB=1 for LV B, storage controller A has a good cache and condition c1 of the process is satisfied. Therefore, storage controller A puts LV B online.

Thereafter, storage controller A unkills storage controller B, and the cache remirror succeeds. Thus, both storage controllers A and B have good caches. AgeB for LV B is updated such that AgeA=2 and AgeB=2 for logical LV B. This, satisfies condition d3 of the process included above.

Figure 3K:
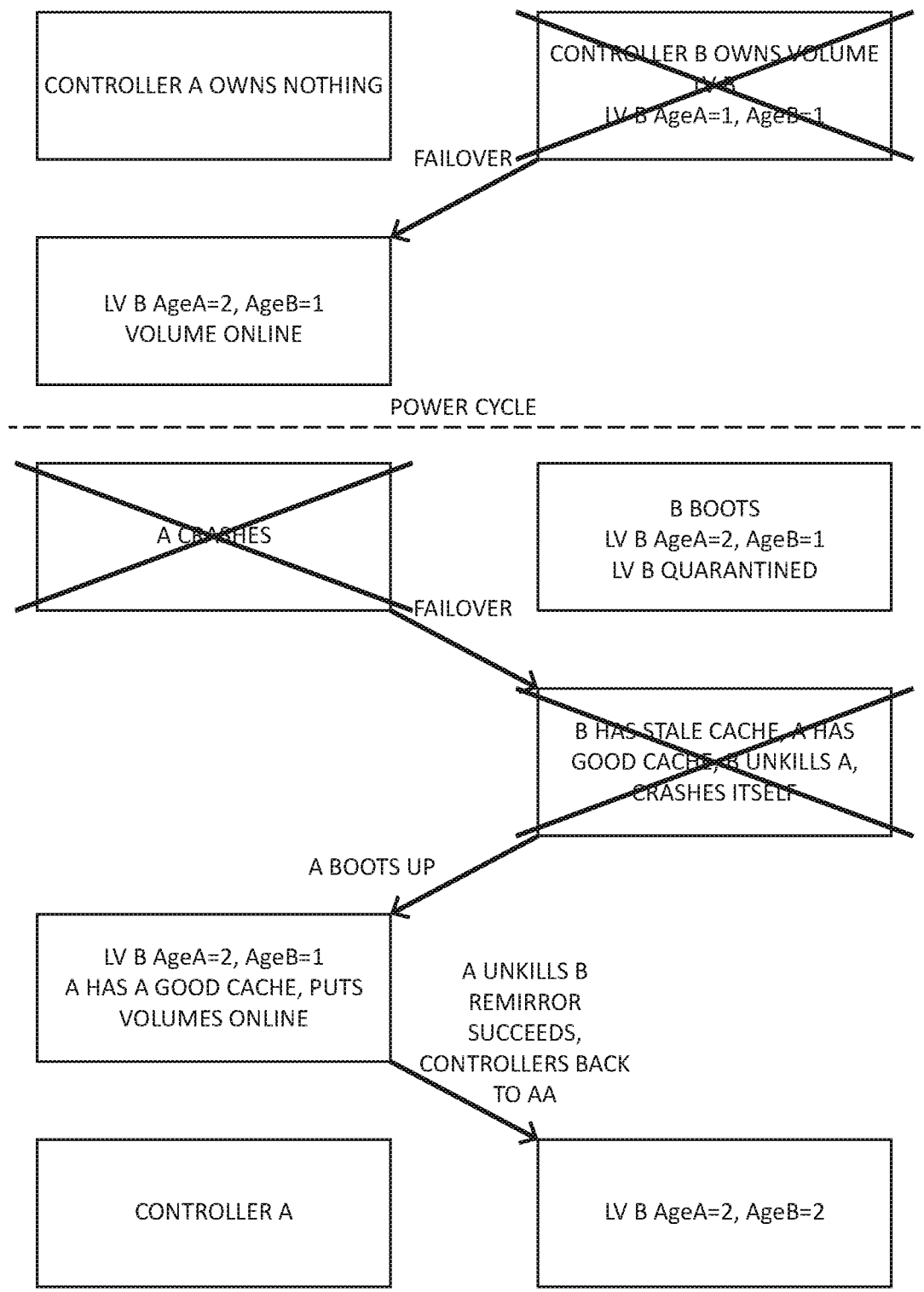

Referring now to FIG. 3K, a simplified block diagram that illustrates Scenario 11 of Table 1 is shown. In this scenario, initially, storage controller A owns nothing, storage controller B owns LV B, and storage controller B fails. Further, in the initial state, AgeA=1 and AgeB=1 for LV B.

After storage controller B's failure, a failover operation is carried out. After the failover successfully completes, AgeA for LV B is incremented by 1, thereby satisfying the process rule c1.

Storage controllers A and B are then power cycled. During the power cycle, storage controller A crashes and storage controller B boots.

After storage controller A's failure (e.g., crash), a failover operation, which involves storage controller B taking over ownership of LV B, is carried out. Since the age fields for LV B have values of AgeA=2 and AgeB=1, and storage controller A has still not recovered from the crash, LV B is quarantined in accordance with process rule c2. Also, the age field values imply that LV B has a stale cache and LV A has a good cache.

After the failover operation, storage controller B unkills storage controller A, but crashes itself. Storage controller A boots up. Since AgeA=2 and AgeB=1 for LV B, storage controller A has a good cache and condition c1 of the process is satisfied. Therefore, storage controller A puts LV B online.

Thereafter, storage controller A unkills storage controller B, and the cache remirror succeeds. Thus, both storage controllers A and B have good caches. AgeB for LV B is updated such that AgeA=2 and AgeB=2 for LV B. This, satisfies condition d3 of the process included above.

Figure 3L:
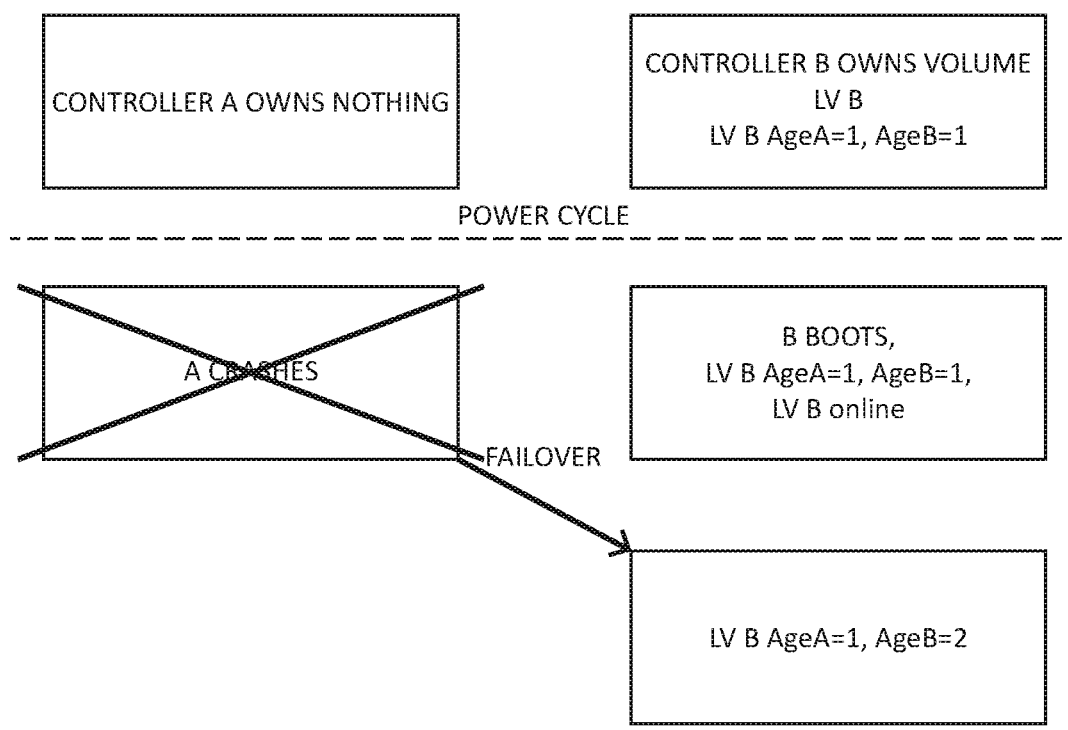

Referring now to FIG. 3L, a simplified block diagram that illustrates Scenario 12 of Table 1 is shown. In this scenario, initially, storage controller A owns nothing, storage controller B owns LV B, and age fields for LV B have values of AgeA=1 and AgeB=1. Storage controllers A and B are then power cycled. During the power cycle, storage controller A crashes. However, controller B boots up.

After storage controller A's failure and storage controller B booting up, a failover operation, which involves storage controller B taking over ownership of LV B, is carried out. After the failover successfully completes, AgeB for LV B is incremented by 1, thereby satisfying the process rule c1 to keep LV B online.

The above-disclosed subject matter is to be considered illustrative, and not restrictive, and the appended claims are intended to cover all such modifications, enhancements, and other embodiments, which fall within the true scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A system comprising:
   first and second redundant controllers;
   at least one logical volume accessible to the first and second redundant controllers;
   metadata fields associated with the at least one logical volume, the metadata fields including a first age field configured to store a first age value associated with the first controller and a second age field configured to store a second age value associated with the second controller, wherein both the first age value and the second age value are employable together by each of the first and second redundant controllers to independently determine whether cache data for the at least one logical volume is valid; and
   a processor configured to update the first and second age values in the respective first and second age fields.

2. The system of claim 1 and wherein the processor is further configured to store a same age value in the first and second age fields when the at least one logical volume is newly created and both the first and second redundant controllers are operating normally.

3. The system of claim 1 and wherein the at least one logical volume comprises a plurality of logical volumes, and wherein a first logical volume of the plurality of logical volumes is owned by the first controller and a second logical volume of the plurality of logical volumes is owned by the second controller.

4. The system of claim 3 and wherein the processor is a part of the first controller, and wherein the processor is further configured to:
set the first age value in the first age field to be greater than the second age value in the second age field of both the first and second logical volumes when the second controller fails, and the second logical volume is failed over to the first controller.

5. The system of claim 3 and wherein the processor is a part of the first controller, and wherein the processor is further configured to:
increment the first age value in the first age field of the metadata fields of the first and second logical volumes when:
the second controller fails;
the first controller fails over the second logical volume; and
the first and second age values of the first and second logical volumes are equal after the failure of the second controller and before the first controller fails over the second logical volume.

6. The system of claim 5 and wherein the processor is further configured to:
remirror the cache data to the second controller when the second controller boots back up, and failback of the second controller is in process.

7. The system of claim 6 and wherein the processor is further configured to set the first age value equal to the second age value in the first and second age fields of the metadata fields of the first and second logical volumes when the remirror of the cache data is successful and before the failback of the second controller is complete.

8. The system of claim 3 and wherein the processor is a part of the first controller, and wherein the processor is further configured to:
take over the second logical volume when the second controller fails; and
after taking over the second logical volume, maintain an online status of the second logical volume when the first age value is greater than the second age value.

9. The system of claim 3 and wherein the processor is a part of the first controller, and wherein the processor is further configured to:
take over the second logical volume when the second controller fails; and
after taking over the second logical volume, quarantine the second logical volume when the first age value is less than the second age value.

10. A method comprising:
maintaining, by first and second redundant controllers, cache data for at least one logical volume; and
managing, by a processor, metadata fields associated with the at least one logical volume, the metadata fields including a first age field capable of storing a first age value associated with the first controller and a second age field capable of storing a second age value associated with the second controller, wherein both the first age value and the second age value are employable together by each of the first and second redundant controllers to independently determine whether the cache data for the at least one logical volume is valid.

11. The method of claim 10 and further comprising storing a same age value in the first and second age fields when the at least one logical volume is newly created and both the first and second redundant controllers are operating normally.

12. The method of claim 10 and wherein the at least one logical volume comprises a plurality of logical volumes, and wherein a first logical volume of the plurality of logical volumes is owned by the first controller and a second logical volume of the plurality of logical volumes is owned by the second controller.

13. The method of claim 12 and further comprising setting the first age value in the first age field to be greater than the second age value in the second age field of both the first and second logical volumes when the second controller fails, and the second logical volume is failed over to the first controller.

14. The method of claim 12 and further comprising incrementing the first age value in the first age field of the metadata fields of the first and second logical volumes when:
the second controller fails;
the first controller fails over the second logical volume; and
the first and second age values of the first and second logical volumes are equal after the failure of the second controller and before the first controller fails over the second logical volume.

15. The method of claim 14 and further comprising:
remirroring the cache data to the second controller when the second controller boots back up, and failback of the second controller is in process.

16. The method of claim 15 and further comprising setting the first age value equal to the second age value in the first and second age fields of the metadata fields of the first and second logical volumes when the remirror of the cache data is successful and before the failback of the second controller is complete.

17. The method of claim 12 and further comprising:
taking over the second logical volume when the second controller fails; and
after taking over the second logical volume, maintaining an online status of the second logical volume when the first age value is greater than the second age value.

18. The method of claim 3 and further comprising:
taking over the second logical volume when the second controller fails; and
after taking over the second logical volume, quarantining the second logical volume when the first age value is less than the second age value.

19. A system comprising:
a data storage device comprising at least one logical volume accessible to a plurality of redundant controllers; and
metadata fields of the at least one logical volume including multiple age fields, with each different age field of the multiple age fields configured to store a different age value associated with a different controller of the plurality of redundant controllers, the age values being employed to provide an indication of whether cache data for the at least one logical volume is valid.

20. The system of claim 19 and further comprising a processor configured to update the age values in the respective age fields.

* * * * *